Patented Dec. 29, 1931

1,838,422

UNITED STATES PATENT OFFICE

JOHN W. LITTLEFORD, OF MULBERRY, FLORIDA, AND FRANCIS F. JOHNSTON, OF MOUNT PLEASANT, TENNESSEE, ASSIGNORS TO MINERALS SEPARATION NORTH AMERICAN CORPORATION, OF NEW YORK, N. Y., A CORPORATION OF MARYLAND

CONCENTRATION OF PHOSPHATE-BEARING MATERIAL

No Drawing.   Application filed October 2, 1930.   Serial No. 486,056.

This invention relates to concentration of phosphate-bearing material and is herein illustrated as applied to what is known as Tennessee rock which is in finely divided condition or has been ground to such condition. Such rock often contains a high percentage of bone phosphate of lime, the desired element in a phosphate fertilizer raw material, but it also contains usually from 4% to 6% or more of iron and aluminum oxide, in the form of salts or other compounds which are extremely deleterious in their action. These compounds often cause reversion of the phosphates from the available phosphate form to the insoluble form, which reduces the value of the fertilizer. They also bring about a physical condition of the superphosphate made from it which tends to make it wet and soggy and more difficult to apply as a fertilizer. These undesired substances, containing iron and aluminum, add to the consumption of acid, and they and/or their products in solution act as a diluent to lower the effective free phosphoric acid content of the liquor which is later used for the acidulation of further phosphate rock in the production of multiple superphosphate.

These substances also form troublesome compounds, difficult to filter out in the preparation of tri-sodium phosphate and di-sodium phosphate. Moreover the gelatinous precipitate formed by these substances retains substantial quantities of phosphoric acid, removing it from the solution, and reducing the yield of desired compounds.

According to the present invention, the amount of iron and aluminum compounds present may be notably diminished and the phosphate-bearing material at the same time concentrated so that the resulting material is richer in bone phosphate of lime. To effect these results the phosphate-bearing material is treated with a sulphide, such as sodium sulphide or hydrogen sulphide gas, and the sulphide-treated material is concentrated, as by desliming or by froth-flotation, to remove the undesired minerals. Thirty-five cubic feet of hydrogen sulphide gas per ton of dry phosphate-bearing material has been found to give a satisfactory treatment.

Sometimes the best results have been obtained when the hydrogen sulphide is passed into a pulp containing added metallic salt adapted to form an insoluble sulphide, such as copper sulphate.

*Example I.*—Dorr bowl thickener underflow from a plant treating Tennessee rock was fed to a Dorr bowl classifier from which the overflow went to waste and the rake discharge was fed to a minerals separation agitation flotation machine in the form of a 50% pulp, and hydrogen sulphide was passed into the pulp through an air port. It was found that the hydrogen sulphide could be added by passing it through a long tube terminating well down into the pulp. After this treatment the contents of the machine were fed to an under-current drag classifier, with the addition of water, yielding as a finished product the rake discharge of the classifier. The results are shown in the following table in which B. P. L. represents bone phosphate of lime, and $Fe_2O_3$ and $Al_2O_3$ represent iron and aluminum oxides, respectively, the amounts being stated in percentages.

| | B. P. L. % | $Fe_2O_3$ and $Al_2O_3$ % |
|---|---|---|
| Feed: | | |
| Plant Dorr thickener underflow | 74.31 | 4.78 |
| Dorr bowl rake discharge | 76.80 | 3.60 |
| Undercurrent drag-classifier rake discharge | 80.05 | 45 |

*Example II.*—Another lot of the same Dorr bowl thickener underflow was fed to the Dorr bowl classifier from which the overflow went to waste, and the rake discharge was fed to the same minerals separation machine, where it was treated with hydrogen sulphide as above described. Then without removing the pulp from the machine 0.3 pounds of sodium oleate soap was added to the thinned pulp and 0.07 pounds of creasote oil was also added, both per ton of feed, and an iron and aluminum-bearing froth removed. This froth contained a considerable proportion of the iron and aluminum of the original material. The rest of the pulp was deslimed in the undercurrent drag classifier, yielding as a final concentrate product the rake discharge, containing 78.92% bone phosphate of lime and 3.25% iron and aluminum oxides.

*Example III.*—Underflow from the Dorr thickener of a Tennessee plant, which had been obtained in the treatment of another lot of Tennessee rock, was separated in an undercurrent drag-classifier from which the overflow went to waste and the rake discharge was delivered to the same minerals separation machine as a 50% pulp. The material was treated with hydrogen sulphide as above described. The treated pulp was then placed in an undercurrent drag classifier from which the overflow went to waste. The rake discharge was made into a pulp with further water in the minerals separation machine and agitated with 0.2 pounds caustic soda, 0.6 pounds oleic acid and 4 pounds fuel oil, all per ton of feed, and a flotation concentrate separated. The results are shown in the following table:

| | B. P. L. % | $Fe_2O_3$ and $Al_2O_3$ % |
|---|---|---|
| Feed: | | |
| Plant Dorr thickener underflow | 71.54 | 5.80 |
| Rake discharge from first drag-classifier treatment | 74.47 | 4.65 |
| Rake discharge from second drag-classifier treatment (after treatment with $H_2S$) | 74.47 | 3.85 |
| Flotation concentrates | 78.24 | 3.65 |

It was found that if the thick pulp was stored overnight after treatment with hydrogen sulphide, it failed to yield equivalent results unless it had been kept well covered with water.

*Example IV.*—A mixture of the coarse material known as classifier sands and the coarse material known as cone sands, separated in water classification steps from a concentration treatment of ground Tennessee phosphate rock, was reground in a mill until the material all passed 35-mesh. The contents of the mill were transferred to a minerals separation subaeration testing machine, using as little water as possible. This pulp was agitated for one minute with the further addition of 0.08 pounds hydro-chloric acid and 0.45 pounds of copper sulphate, both per ton of dry material. Hydrogen sulphide was then passed into the pulp through the air intake of the testing machine until the pulp was black. This required rather less than the 35 cubic feet of $H_2S$ gas per ton otherwise deemed advisable. Then there were added 0.1 pound of Procter and Gamble soap powder and 0.5 pounds of crude pine tar oil, both per ton of dry material, the pulp diluted and agitated to produce a preliminary or reject froth relatively rich in iron and aluminum and in insolubles, which was separated as long as any solid material was carried over. The remaining pulp was dewatered, made into a pulp with fresh water, and reagitated in the same machine with the addition of 0.5 pounds caustic soda, 0.6 pounds oleic acid, and 4.5 pounds of fuel oil, all per ton of dry feed, to yield a froth phosphate mat-concentrate and a tailing. The concentrate thus obtained was put back into the machine and reagitated to yield a finished concentrate and a middling. The results are shown in the following table.

| | Weight % | B. P. L. % | $Fe_2O_3$ and $Al_2O_3$ % | Ins. % |
|---|---|---|---|---|
| Feed | 100 | 71.09 | 4.66 | 9.29 |
| Froth concentrate | 18.01 | 50.34 | 9.1 | 21.20 |
| First tailing | 81.99 | 75.17 | 4.1 | 8.47 |
| Mat concentrate | 58.13 | 78.78 | 3 | 5.09 |
| Middling | 8.93 | 74.66 | 4.35 | 8.48 |
| Tailing | 11.43 | 63.34 | 5.77 | 21.46 |

It will be noted from this table that the final reject or tailing contains substantially more of the iron and aluminum compounds than does the mat phosphate-bearing concentrate. Thus it appears that the treatment with hydrogen sulphide in the presence of the copper sulphate resulted not only in making a substantial part of the iron and aluminum compounds more floatable than the phosphate material, but also resulted in making another substantial part of the iron and aluminum compounds less floatable than the desired phosphate material. In this way iron and aluminum compounds of two types were removed, one type in a froth and another type in the final tailing.

*Example V.*—Another lot of the same material was subjected to substantially the same treatment and produced a slightly richer float and a smaller recovery, with a slight altering of the conditions of the finished concentrate carrying 79.87% B. P. L., equal to 43.7% of the crude material.

Other tests on slightly different lots of phosphate material gave parallel results. It was found that a solution of sodium oleate gave substantially the same results as the soap powder. Doubling the amount of copper sulphate gave a rather better result in the treatment of lower grade feed.

Having thus described certain embodiments of the invention, what is claimed is:

1. The process of concentrating a phosphate-bearing material which consists in agitating a pulp of the material so as to mix it with a sulphide, and separating iron-and-aluminum-containing compounds from the bulk of the phosphate-bearing material.

2. A process of concentrating phosphate-bearing material which consists in agitating a thick pulp of the material containing hydrogen sulphide and thereafter separating iron-and-aluminum-containing compounds from the rest of the material.

3. A process of concentrating phosphate-bearing material which consists in agitating a thick pulp of the material while passing hydrogen sulphide into it, and thereafter separating iron-and-aluminum-containing compounds from the rest of the material.

4. A process of concentrating phosphate-bearing material which consists in agitating a thick pulp of the material while passing hydrogen sulphide into it, and thereafter separating iron-and-aluminum-containing compounds from the rest of the material, and thereafter concentrating phosphate contained in the phosphate-bearing material.

5. A process of concentrating phosphate-bearing material which consists in agitating a pulp of the material with hydrogen sulphide, separating iron-and-aluminum-containing compounds from the rest of the material, and then subjecting the pulp to a flotation operation to produce a phosphate-bearing mat concentrate, and separating the concentrate.

6. A process of concentrating phosphate-bearing material which consists in agitating a thick pulp of the material with a sulphide, thinning the pulp separating iron-and-aluminum-containing compounds from the pulp by a froth-flotation operation, and thereafter concentrating the remainder of the pulp by flotation to yield a phosphate-bearing float concentrate, and separating the concentrate.

7. A process of concentrating phosphate-bearing material which consists in agitating a pulp of the material with a metallic salt adapted to yield an insoluble sulphide, agitating with a soluble sulphide, to precipitate the metallic sulphide, and separating iron and alumina compounds from the bulk of the phosphate-bearing material.

8. A process of concentrating phosphate-bearing material which consists in agitating a pulp of the material with a metallic salt adapted to yield an insoluble sulphide, agitating with hydrogen sulphide to precipitate the metallic sulphide, separating iron and alumna compounds from the remainder of the phosphate-bearing material, and concentrating said remainder.

9. A process of concentrating phosphate-bearing material which consists in agitating a thick pulp of the material with copper sulphate and with a soluble sulphide so that copper sulphide is precipitated, separating iron and alumina compounds from the remainder of the phosphate-bearing material by froth flotation, and concentrating said remainder.

10. A process of concentrating phosphate-bearing material which consists in agitating pulp of the material with copper sulphate and with hydrogen sulphide so that copper sulphide is precipitated, separating iron and alumina compounds from the remainder of the phosphate-bearing material by froth flotation, dewatering said remainder, and agitating a pulp of the remainder to yield a phosphate-bearing concentrate.

11. A process of concentrating phosphate-bearing material which consists in agitating a pulp of the material with copper sulphate and added acid, further agitating the pulp with hydrogen sulphide to precipitate copper sulphide, separating iron and alumina compounds from the remainder of the phosphate-bearing material by agitating the thin pulp of the material with a flotation agent to form an iron-and-aluminum-bearing froth, separating the froth, dewatering the pulp, agitating the thinned pulp with other flotation agents to yield a floating phosphate-bearing float concentrate, and separating the float.

In testimony whereof, we have signed this specification.

JOHN W. LITTLEFORD.
FRANCIS F. JOHNSTON.

CERTIFICATE OF CORRECTION.

Patent No. 1,838,422. December 29, 1931.

JOHN W. LITTLEFORD, ET AL.

It is hereby certified that error appears in the printed specification of the above numbered patent requiring correction as follows: Page 1, line 82, for the last figure in the boxed table ".45" read 3.45; and that the said Letters Patent should be read with this correction therein that the same may conform to the record of the case in the Patent Office.

Signed and sealed this 17th day of September, A. D. 1935.

Leslie Frazer
Acting Commissioner of Patents.

(Seal)